United States Patent
Giacobbi et al.

(10) Patent No.: US 9,079,441 B1
(45) Date of Patent: Jul. 14, 2015

(54) SYSTEM FOR DETECTING INOPERATIVE INKJETS IN THREE-DIMENSIONAL OBJECT PRINTING USING AN OPTICAL SENSOR HAVING AN ADJUSTABLE FOCUS

(71) Applicant: Xerox Corporation, Norwalk, CT (US)

(72) Inventors: James L. Giacobbi, Penfield, NY (US); Matthew R. McLaughlin, Rochester, NY (US); Victoria L. Warner, Caledonia, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/231,286

(22) Filed: Mar. 31, 2014

(51) Int. Cl.
| | | |
|---|---|---|
| B41J 29/393 | (2006.01) | |
| G01C 3/08 | (2006.01) | |
| B41J 2/045 | (2006.01) | |
| B33Y 30/00 | (2015.01) | |
| G01S 17/89 | (2006.01) | |

(52) U.S. Cl.
CPC .............. *B41J 29/393* (2013.01); *B41J 2/0451* (2013.01); *B33Y 30/00* (2014.12); *G01S 17/89* (2013.01)

(58) Field of Classification Search
CPC .... B41J 2/0451; B41J 2/2135; B41J 2/04586; G01S 17/89
See application file for complete search history.

(56) References Cited

U.S. PATENT DOCUMENTS

| | | |
|---|---|---|
| 2004/0012112 A1 | 1/2004 | Davidson et al. |
| 2006/0111807 A1 | 5/2006 | Gothait et al. |
| 2006/0141145 A1 | 6/2006 | Davidson et al. |
| 2009/0011066 A1 | 1/2009 | Davidson et al. |
| 2010/0151136 A1 | 6/2010 | Davidson et al. |
| 2011/0074860 A1* | 3/2011 | Saettel et al. ................... 347/19 |
| 2011/0074861 A1* | 3/2011 | Saettel et al. ................... 347/19 |

* cited by examiner

*Primary Examiner* — Lisa M Solomon
(74) *Attorney, Agent, or Firm* — Maginot Moore & Beck LLP

(57) ABSTRACT

An apparatus detects inoperative inkjets during printing of three-dimensional objects. The apparatus uses a light source to illuminate an area below a printhead and a digital camera to generate image data of drops of material ejected by inkjets in the printhead. The image data of the ink drops passing through the field of view of the camera are analyzed to identify inoperative inkjets in the printhead.

16 Claims, 5 Drawing Sheets

SYSTEM FOR DETECTING INOPERATIVE INKJETS IN THREE-DIMENSIONAL OBJECT PRINTING USING AN OPTICAL SENSOR HAVING AN ADJUSTABLE FOCUS

TECHNICAL FIELD

The device disclosed in this document relates to printers that produce three-dimensional objects and, more particularly, to accurate detection of inoperative inkjets in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject drops of material that form the objects. During printing of an object, one or more inkjets can deteriorate by ejecting the material at an angle, rather than normal, to the printhead, ejecting drops that are smaller than an inkjet should eject, or by failing to eject any drop at all. An inkjet suffering from any of these operational deficiencies is known as an inoperative inkjet. If the operational status of one or more inkjets deteriorates during object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. An apparatus that enables detection of inoperative inkjets while printing would enable restorative procedures to be applied during object printing so a properly formed object can be produced. In this manner, product yield for the printer is improved and its printing is more efficient. The apparatus should be able to detect inoperative inkjets that eject a multitude of printing materials, such as clear, colored, translucent, phosphorescent, and waxy materials.

SUMMARY

An apparatus that enables inoperative inkjet detection in three-dimensional printers includes an optical sensor having an adjustable focus to move a focal plane of the optical sensor between a first position and a second position, the optical sensor being configured to generate image data of the focal plane in response to an activation signal, an illumination source positioned to illuminate the focal plane of the optical sensor at the first position and the second position, and a controller operatively connected to the optical sensor, the controller being configured to operate the optical sensor to move the focal plane between the first position and the second position and to generate the activation signal, to generate a signal for operating a printhead to eject drops of material from inkjets in a row of inkjets in a printhead that are aligned with the focal plane of the optical sensor at one of the first and second positions, and to identify inoperative inkjets in the printhead with reference to image data of the focal plane received from the optical sensor.

A printer that incorporates the apparatus for detecting inoperative inkjets includes a printhead configured with a plurality of inkjets arranged in at least two rows, an optical sensor having an adjustable focus to move a focal plane of the optical sensor that is perpendicular to the printhead to enable the focal plane to be aligned with the inkjets in a first row of inkjets in the printhead when the focal plane is in a first position and to be aligned with the inkjets in a second row of inkjets in the printhead when the focal plane is in a second position, the optical sensor being configured to generate image data of the focal plane in response to an activation signal, an illumination source positioned to illuminate the focal plane of the optical sensor at the first position and the second position, and a controller operatively connected to the printhead and to the optical sensor, the controller being configured to operate the optical sensor to move the focal plane between the first position and the second position and to generate the activation signal, to operate the printhead to eject drops of material from inkjets in the row of inkjets aligned with the focal plane, and to receive image data of the focal plane generated by the optical sensor in response to the activation signal.

BRIEF DESCRIPTION OF THE DRAWINGS

The foregoing aspects and other features of an apparatus or printer that detects inoperative inkjets during three-dimensional printing are explained in the following description, taken in connection with the accompanying drawings.

DETAILED DESCRIPTION

Figure 1:
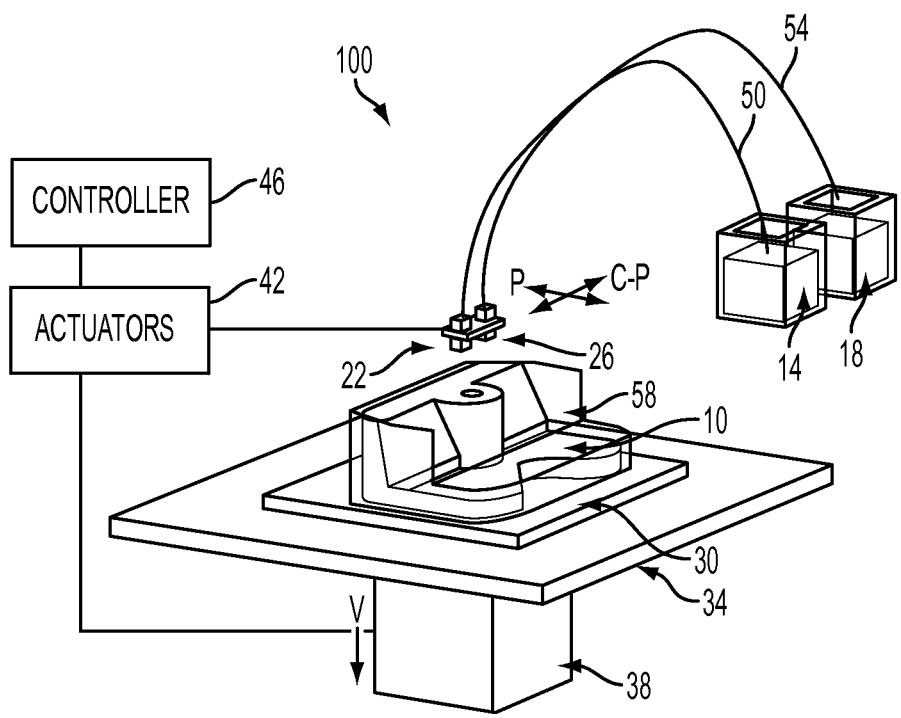
FIG. 1 is a perspective view of a three-dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both inkjet printheads are operated by the controller 50 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
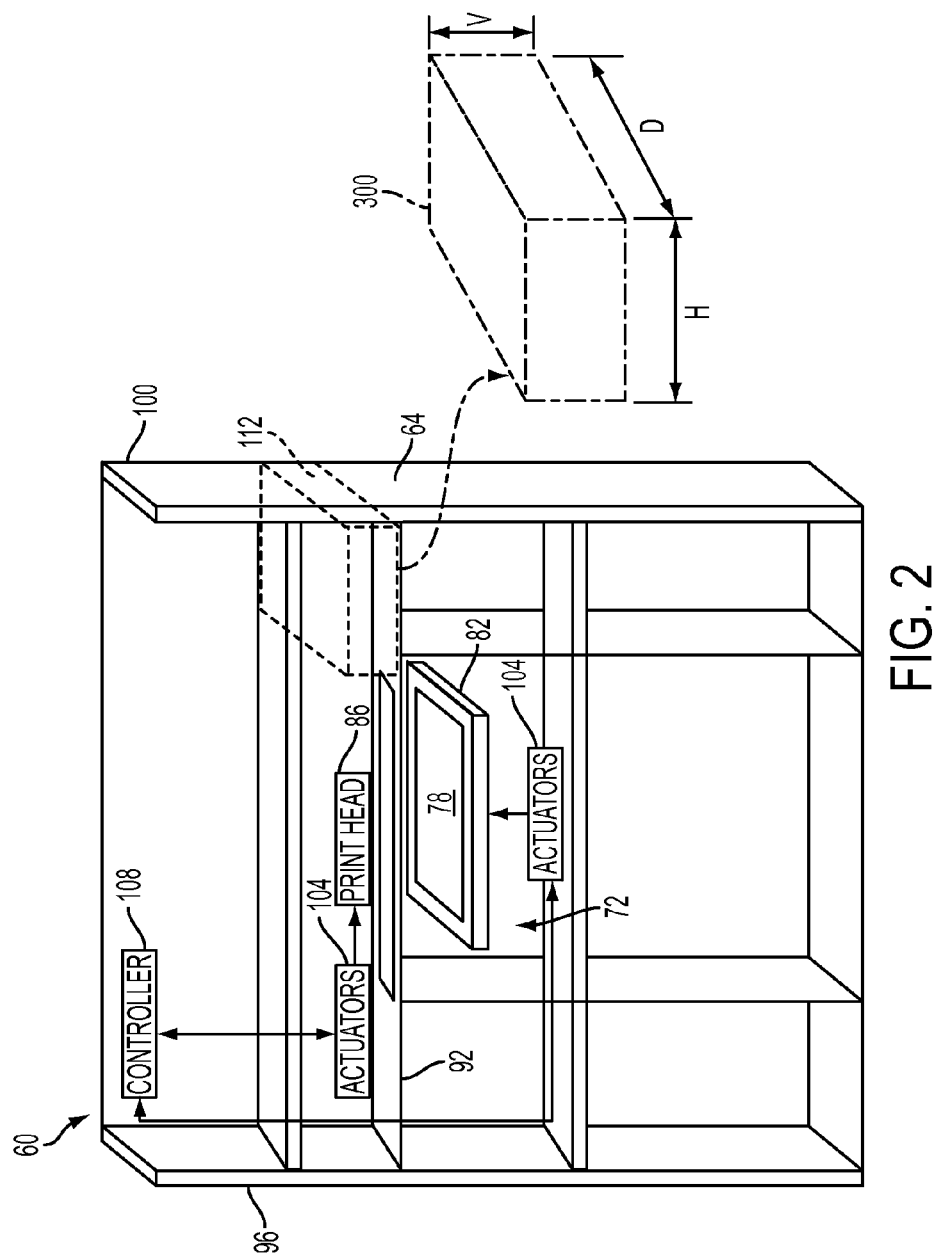
FIG. 2 is front view of a three-dimensional object printer having a housing that depicts a space within the housing for a module that enables inoperative inkjets in the printhead to be detected during a printing operation.

A three-dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that uses electrical continuity checks to detect inoperative inkjets in the printer 60. As noted above, if an inkjet fails during printing of an object by either completely or partially failing to eject material or by errantly ejected material in a skewed direction, the object being produced is malformed. Currently, this malformation cannot be detected until production of the object is finished. By using area 112 for capturing image data of inkjets ejecting material, printer 60 can be configured to detect inoperative inkjets during object production as described more fully below. Some components within the module 300 can move in the horizontal direction H, depth direction D, and vertical direction V as shown in the figure.

Figure 3:
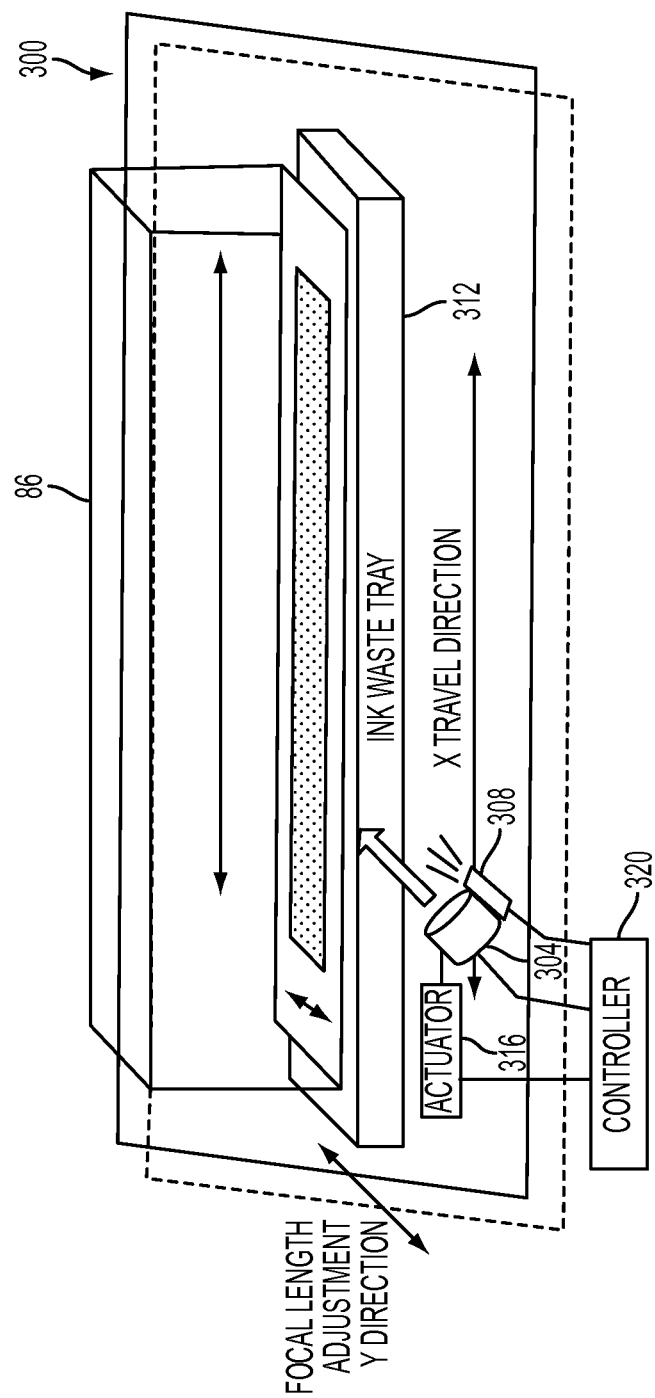
FIG. 3 is a perspective view of a module for detecting inoperative inkjets that fits in the space shown in FIG. 2.

One embodiment of a module that detects inoperative inkjets during object printing is shown in the block diagram of FIG. 3. The module 300 is configured to fit within area 112 of printer 60. The module 300 includes a high speed optical sensor 304, a light source 308, a waste receptacle 312, one or more actuators 316, and a controller 320. The controller is operatively connected to the optical sensor 304, the light source 308, the actuators 316, and the controller 108 that moves the printhead 86. In one embodiment described below, the high speed optical sensor is a digital camera having a shutter speed of approximately 0.002 seconds and the field of vision is approximately 5 mm in the direction in which the material is ejected.

Figure 4:
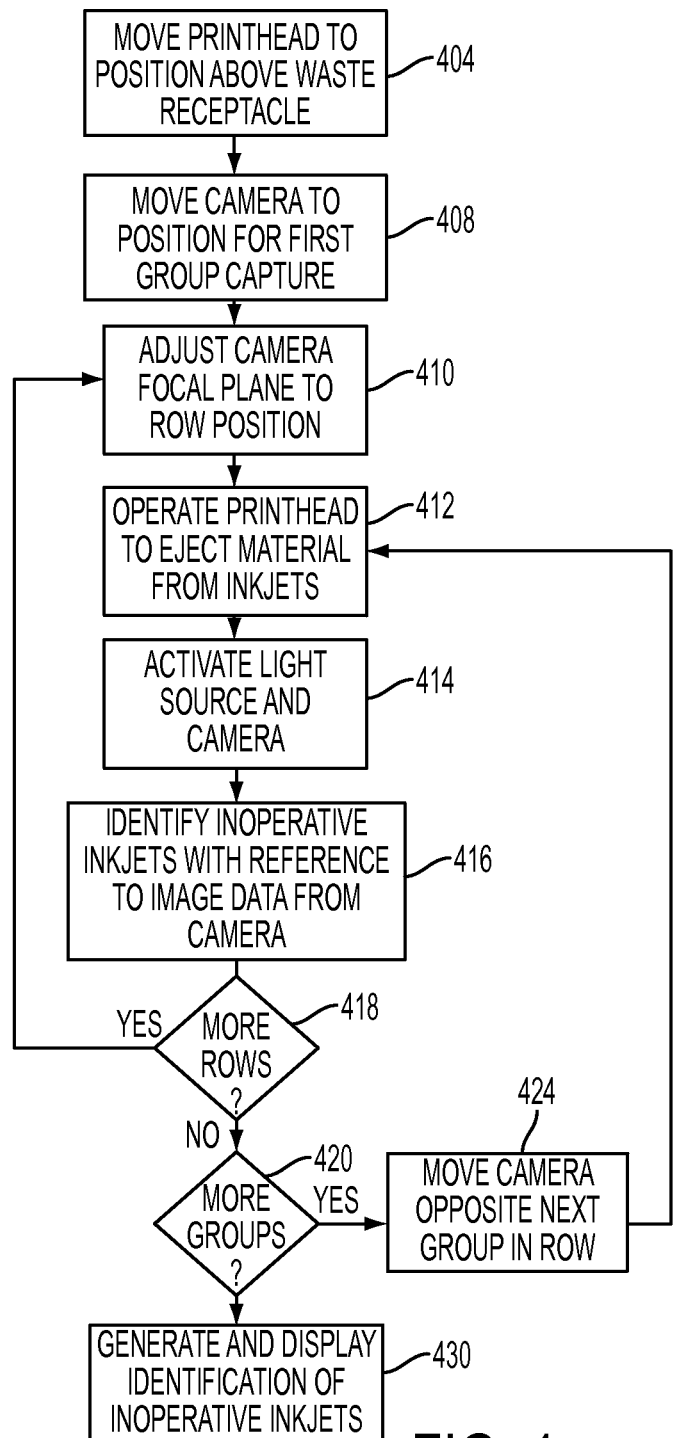
FIG. 4 is a flow diagram of a method for operating the module of FIG. 3.

To detect inoperative inkjets during printing operations, the module 300 is operated with reference to the method 400 shown in FIG. 4. Method 400 is implemented with controllers configured to perform the method. As used in this document, configuring a controller means storing programmed instructions in a memory operatively connected to the controller so when the controller executes the programmed instructions the controller generates signals to manipulate data and operate electronic components to perform the method.

Figure 5:
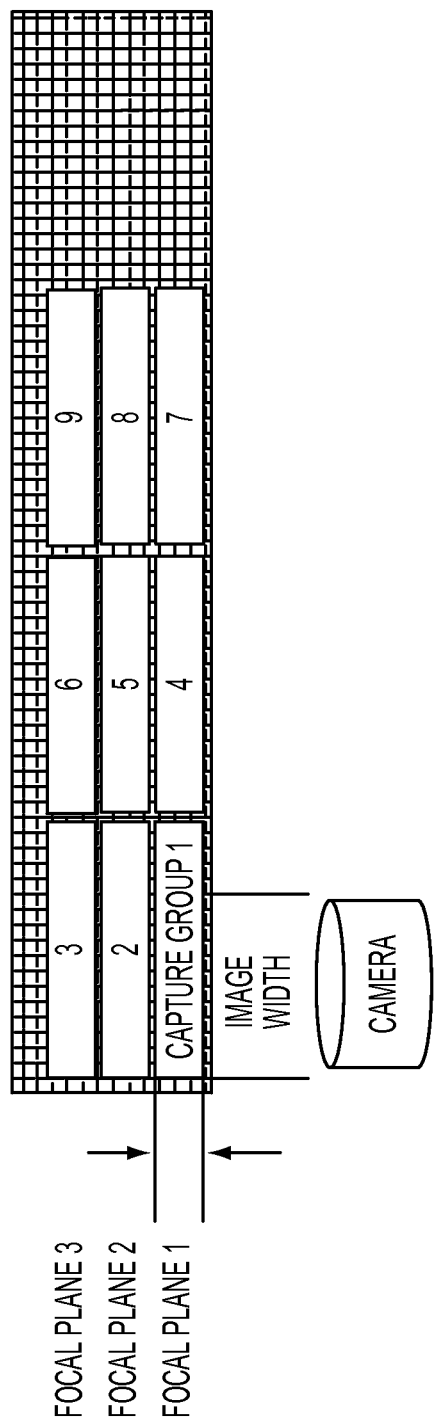
FIG. 5 is an perspective view of a printhead face that illustrates the X and Y directions of movement for imaging the ejections from inkjets in the printhead.

At predetermined times in the printing operation, the controller 108 (FIG. 2) operates an actuator 104 to move the printhead 86 into the module 300 located in the area 112 (block 404). In response to the controller 320 detecting the printhead in the module 300, controller 320 generates a signal to an actuator 316 to move the camera 304 to a home position (block 408). As shown in FIG. 5, the home position can be at one end of the printhead to enable the camera to capture an image of a predetermined number of inkjets from the end of the row that eject material. After the controller 320 detects the camera being at the first capture position, controller 320 generates a signal for the camera 304 to adjust the focal plane of the camera to a depth that corresponds to the distance between the camera and the closest row in the printhead to the camera (block 410). Controller 320 then generates an electrical signal for controller 108 to operate the predetermined number of the inkjets in the printhead to eject material (block 412). The controller 320 also activates the light source 308 to illuminate the area beneath the printhead 86 and the camera is operated to generate image data of the illuminated area (block 414). The camera is operated to generate image data during the time in which each group of inkjets ejects material. The light source 308, however, can be activated at the start of the test and maintained until the last group of inkjets is operated, at which time the light source is turned off, or the light source can be activated with each operation of the camera. The controller 320 analyzes the data from the camera to identify inoperative inkjets (block 416). This analysis includes detecting the absence of an ejected material drop, a drop having a velocity that is not within a predetermined velocity range, or a drop having a mass that is not within a predetermined mass or size range. Controller 320 checks to see if more rows of inkjets are to be tested (block 418) and, if another row of inkjets remains to be tested, the controller 320 generates electrical signals for the camera to adjust its focal plane in the Y direction by a distance separating the rows of inkjets in the printhead (block 410). The Y direction is movement from one row in a printhead to another row in the printhead (FIG. 5). Controller 320 then generates the signals for controller 108 to operate the predetermined number of inkjets in the next row of the printhead (block 412), while controller 320 either synchronizes activation of the light source 308 and operation of the camera 304 to capture image data of the material ejection (block 414). Alternatively, as noted above, the controller 320 keeps the light source on until all of the inkjet groups have been imaged ejecting material. The controller 320 analyzes these image data for detection of inoperative inkjets (block 416). The focal plane adjustment and imaging of the predetermined number of inkjets ejecting material in each row continues (blocks 410 to 416) until the predetermined number of inkjets in each row are tested (block 418). If more groups are to be tested (block 420), controller 320 then generates electrical signals to operate the actuator 316 operatively connected to the camera 304 to move the camera in the X direction by a distance that corresponds to the predetermined number of inkjets (block 424). The process then continues by detecting inoperative inkjets from image data of the predetermined number of inkjets ejecting material (blocks 412 to 416), checking whether additional rows are to be imaged (block 418), adjusting the focal plane, capturing image data, and analyzing the data to identify inoperative inkjets until all of the rows have been tested (blocks 410 to 416). Controller 320 operates the actuator 316 to move the camera 304 in the X direction and captures image data of the predetermined number of inkjets in each row of the next section in each row until all of the inkjet groups have been evaluated (block 420). Controller 320 then generates a list of the inoperative inkjets for the operator (block 430) so appropriate action can be taken. Also, from time to time, the waste receptacle 312 is removed from the printer, emptied, and reinstalled in the printer. Alternatively, the waste receptacle could be replaced with another waste receptacle.

In the embodiment described above, only a predetermined number of inkjets in a single row are operated. This predetermined number corresponds to the number of inkjets that can been seen in the field of view of the camera 304. Any inkjet that does not produce a drop of the material in the field of view is identified as being inoperative. Although the embodiment described above captures image data in each row before moving the camera to the section in a row, the camera could be moved in the X direction after each image capture until a row is completely imaged. The focal plane could then be changed to the next row, and the camera moved in the opposite X direction to image the entire next row before changing the focal plane to the next row. This process would continue until each row was imaged to enable detection of inoperative inkjets. Alternatively, other combinations of X direction movement and Y focal plane adjustment can be used to test all of the inkjets in a printhead.

While the camera imaging module 300 has been described with reference to a printer that produces three-dimensional objects, it also could be used in inkjet printers. In such printers, the printhead(s) could be moved to an imaging station similar to the one described above where groups of inkjets are operated to eject ink and the camera is used to generate image data of the drops ejected by the inkjets. These image data are then analyzed to detect missing inkjets or inkjets that ejecting drops with a path deviation or with improper mass or volume. Thus, as used in this document, the word "material" refers to substances that can be used to form three dimensional objects as well as inks used in document printing.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
   a printhead configured with a plurality of inkjets arranged in at least two rows;
   an optical sensor having an adjustable focus to move a focal plane of the optical sensor that is perpendicular to the printhead to enable the focal plane to be aligned with the inkjets in a first row of inkjets in the printhead when the focal plane is in a first position and to be aligned with the inkjets in a second row of inkjets in the printhead when the focal plane is in a second position, the optical sensor being configured to generate image data of the focal plane in response to an activation signal;
   an illumination source positioned to illuminate the focal plane of the optical sensor at the first position and the second position; and
   a controller operatively connected to the printhead and to the optical sensor, the controller being configured to operate the optical sensor to move the focal plane between the first position and the second position and to generate the activation signal, to operate the printhead to eject drops of material from inkjets in the row of inkjets aligned with the focal plane, and to receive image data of the focal plane generated by the optical sensor in response to the activation signal.

2. The printer of claim 1, the controller being further configured to detect an absence of drops of material at predetermined positions in the image data received from the optical sensor to identify inoperable inkjets in the printhead.

3. The printer of claim 1, the controller being further configured to identify a volume of each drop of material depicted in the image data received from the optical sensor to identify inkjets in the printhead that are ejecting drops of material less than a predetermined size.

4. The printer of claim 1 wherein the optical sensor has a field of view that enables a first group of inkjets in the row of inkjets aligned with the focal plane of the optical sensor to be imaged, the first group of inkjets having fewer inkjets that a total number of inkjets in the row of inkjets aligned with the focal plane.

5. The printer of claim 4, the optical sensor being configured for movement in a direction that is parallel to the rows of inkjets in the printhead, and the controller being further configured to move the optical sensor parallel to the row of inkjets aligned with the focal plane to enable drops of material ejected by a second group of inkjets in the row of inkjets aligned with the focal plane to pass through the focal plane of the optical sensor, the second group of inkjets being different than the first group of inkjets.

6. The printer of claim 1 wherein the optical sensor is a digital camera.

7. The printer of claim 6 wherein the optical sensor is positioned to enable a field of view of the optical sensor to image drops of material at a distance from the printhead that enables correlation between the drops of material and the inkjets in the row of inkjets aligned in focal plane of the optical sensor.

8. The printer of claim 1, the controller being operatively connected to the illumination source and the controller being further configured to operate the illumination source to produce a light flash as the activation signal is generated.

9. The printer of claim 1 wherein the printhead has more than two rows of inkjets and the adjustable focus of the optical sensor is configured to move the focal plane of the optical sensor to a plurality of positions where the focal plane of the optical sensor is in alignment with one of the rows of inkjets in the printhead; and
 the controller is further configured to operate the optical sensor to move the focal plane between the plurality of positions to align the focal plane of the optical sensor selectively with the rows of the inkjets in the printhead.

10. An apparatus for detecting inoperable inkjets in a printer comprising:
 an optical sensor having an adjustable focus to move a focal plane of the optical sensor between a first position and a second position, the optical sensor being configured to generate image data of the focal plane in response to an activation signal;
 an illumination source positioned to illuminate the focal plane of the optical sensor at the first position and the second position; and
 a controller operatively connected to the optical sensor, the controller being configured to operate the optical sensor to move the focal plane between the first position and the second position and to generate the activation signal, to generate a signal for operating a printhead to eject drops of material from inkjets in a row of inkjets in a printhead that are aligned with the focal plane of the optical sensor at one of the first and second positions, and to identify inoperative inkjets in the printhead with reference to image data of the focal plane received from the optical sensor.

11. The apparatus of claim 10, the controller being further configured to detect an absence of drops of material at predetermined positions in the image data received from the optical sensor to identify inoperable inkjets in the printhead.

12. The apparatus of claim 10, the controller being further configured to identify a volume of each drop of material depicted in the image data received from the optical sensor to identify inkjets in the printhead that are ejecting drops less than a predetermined size.

13. The apparatus of claim 10 wherein the optical sensor has a field of view that is narrower than a length of the row of inkjets aligned with the focal plane of the optical sensor to be imaged.

14. The apparatus of claim 13, the optical sensor being configured for movement in a direction that is parallel to the rows of inkjets in the printhead, and the controller being further configured to move the optical sensor parallel to the row of inkjets aligned with the focal plane to enable drops ejected by a second group of inkjets in the row of inkjets aligned with the focal plane to pass through the focal plane of the optical sensor, the second group of inkjets being different than the first group of inkjets.

15. The apparatus of claim 10 wherein the optical sensor is a digital camera.

16. The apparatus of claim 10, the controller being operatively connected to the illumination source and the controller being further configured to operate the illumination source to produce a light flash as the activation signal is generated.

* * * * *